UNITED STATES PATENT OFFICE.

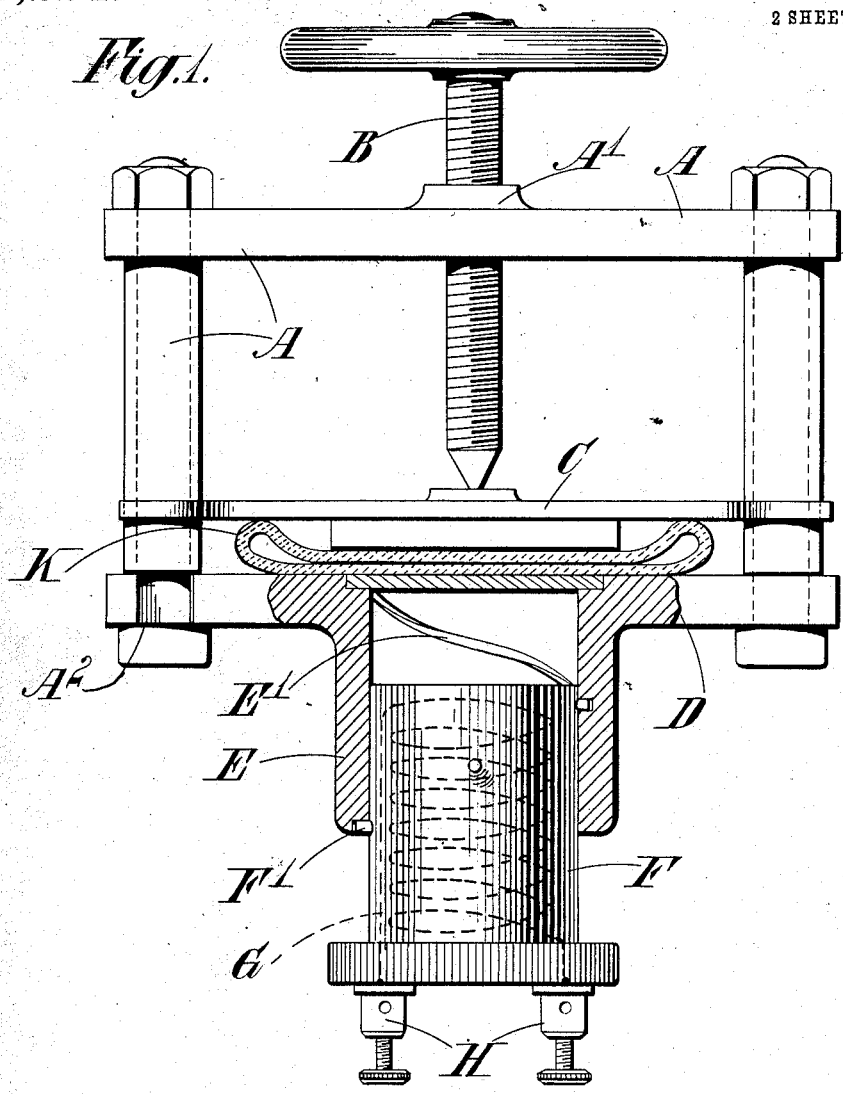
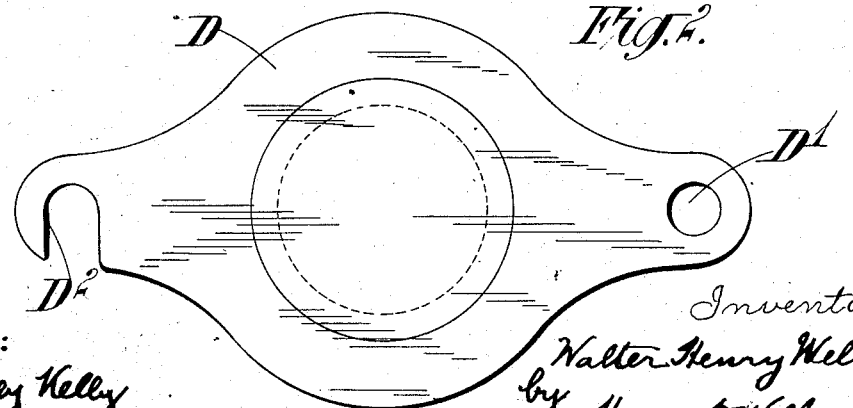

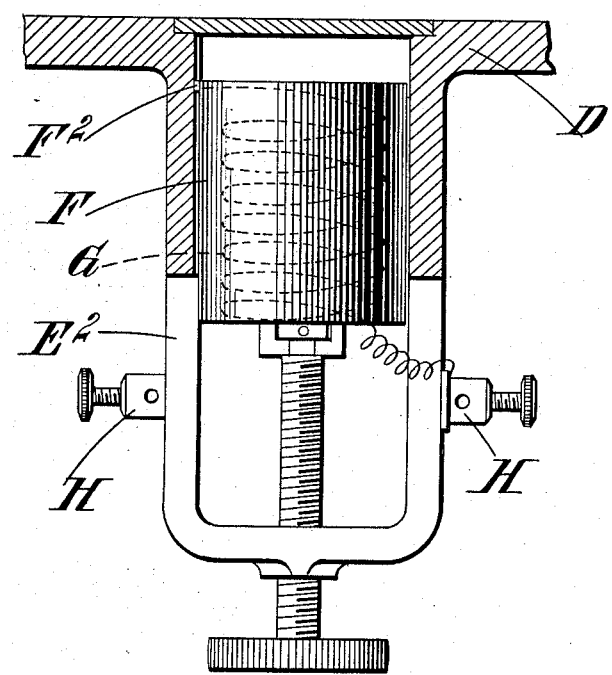

WALTER HENRY WELCH, OF LONDON, ENGLAND, ASSIGNOR TO HARVEY FROST & COMPANY, LIMITED, OF LONDON, ENGLAND.

VULCANIZING APPARATUS.

No. 923,224.  Specification of Letters Patent.  Patented June 1, 1909.

Application filed March 16, 1907. Serial No. 362,645.

*To all whom it may concern:*

Be it known that I, WALTER HENRY WELCH, a subject of the King of Great Britain, residing at London, in England, have invented certain new and useful Improvements in Vulcanizing Apparatus, of which the following is a specification.

This invention relates to portable vulcanizing apparatus suitable for use in repairing tires and the like, and the object of the invention is to provide apparatus of this character with heating devices having a novel and improved arrangement for regulating the degree of heat in the vulcanizing surfaces.

The apparatus according to this invention is heated electrically and is in the form of a press or clamp in which the portion of the tire to be repaired can be placed under pressure, one or both of the pressing surfaces being heated by an electric current.

The heating device is movable relatively to the rest of the apparatus so that it can be brought nearer to or farther away from the material to be vulcanized, and this movement affords a ready means for adjusting the heat without altering the strength of the current by the use of a variable resistance.

In the accompanying drawings—Figure 1 is an elevation, partly in section, showing one form of portable vulcanizer according to this invention; Fig. 2 is a plan of a portion thereof, and Fig. 3 is an elevation, partly in section, of a portion of an alternative form of vulcanizer.

With reference first to Figs. 1 and 2, A is a frame comprising a top plate and side pillars. The top plate is provided with a boss $A^1$ threaded to receive a hand-screw B. The lower end of this screw engages with a presser-plate C which is recessed or otherwise arranged so that the side pillars act as guides for it. Beneath the presser-plate C is a bottom plate D, one end of which is provided with a hole $D^1$ through which one of the side pillars passes while the other end is formed with a hook $D^2$ to engage with a neck $A^2$ formed on the other side pillar. In the center of the bottom plate D is a sleeve E provided with an internal spiral groove $E^1$ to receive projecting pins $F^1$ of a plug F. This plug is the heating member of the press and is provided with an electrical conductor G coiled within the plug and embedded in a suitable cement or otherwise arranged so that on the passage of an electric current through the conductor from the terminals H the plug is heated.

The vulcanizing press is intended primarily for use in vulcanizing patches and is shown with an inner tube K in vulcanizing position. It will be seen that the work is clamped between the under surface of the presser-plate C and the upper surface of the hinged or swinging plate D, the requisite pressure being obtained by means of the hand-screw B.

By rotating the plug it can be caused to move up or down relatively to the surface of the plate D supporting the work, and hence the amount of heat can be regulated.

In the construction shown in Fig. 3, the plug F, instead of being screwed, is arranged to slide vertically in guides $E^2$ extending downward from the plate D. Rotation is prevented by a feather $F^2$ on the plug which engages with a groove on the one guide. In this construction, instead of mounting the terminals H on the plug itself, they are attached to the guides $E^2$ and by way of example the conductor G is shown as having one end attached to the terminal H and the other joined to the frame by the sliding contact between the feather $F^2$ and its guide.

The shape of the presser-plate and the bottom or swinging plate may be made to suit the particular class of work for which it is intended, for instance, the presser-plate might have its under surface concave and the lower plate be made correspondingly convex so as to suit the outer cover of a tire. Further, the presser-plate may be arranged to be heated electrically instead of the lower plate, or, on the other hand, both may be heated in this way.

What I claim as my invention and desire to secure by Letters Patent is—

1. In a portable vulcanizing apparatus, the combination of a vulcanizing plate engaging the work, a heating body adjustable toward and from the plate to vary its heating effect thereon, and means for heating said body internally.

2. In a portable vulcanizing apparatus, the combination of a vulcanizing plate engaging the work, and an electrically heated body arranged to heat the plate and adjustable toward and from the plate to vary its heating effect thereon without varying the flow of heating current.

3. In a portable vulcanizing apparatus, the combination of a vulcanizing plate engaging the work, an electrically heated body arranged to heat the plate, and means for adjusting said body toward and from the plate to vary its heating effect thereon.

4. In a portable vulcanizing apparatus, the combination of a support for the work, a sleeve mounted on the support and substantially perpendicular thereto, a plug slidable in the sleeve to adjust its distance from the support, and an electrical heating coil for the plug.

5. In a portable vulcanizing apparatus, the combination of a frame comprising a top plate and side pillars attached thereto, a work-supporting plate pivotally attached to one of said pillars and detachably engaged with the other pillar, a hollow boss on said plate having a spiral groove within it, a plug fitting in said boss and having a pin adapted to engage with the groove therein, an electrical heating coil in said plug, a presser plate movable relatively to the frame, and a screw working in the top plate and operating the presser plate, substantially as set forth.

In testimony whereof I have signed my name to this specification in the presence of two subscribing witnesses.

WALTER HENRY WELCH.

Witnesses:
C. B. HORTON,
E. M. TOLERTON.